United States Patent [19]

Haley et al.

[11] Patent Number: 4,770,841
[45] Date of Patent: Sep. 13, 1988

[54] METHODS AND APPARATUS FOR DYNAMIC SYSTEMS CONTROL

[75] Inventors: Paul H. Haley, Monroeville; David D. Woods, Murrysville, both of Pa.

[73] Assignee: Westinghouse Electric Corp., Pittsburgh, Pa.

[21] Appl. No.: 916,450

[22] Filed: Oct. 8, 1986

[51] Int. Cl.⁴ ............................................. G21C 7/36
[52] U.S. Cl. .................................... 376/216; 364/553
[58] Field of Search .................... 376/215, 216; 416/1; 364/554, 553, 141, 149, 150, 164, 553

[56] References Cited

U.S. PATENT DOCUMENTS

| | | | |
|---|---|---|---|
| 4,275,447 | 6/1981 | Ruiz | 376/216 |
| 4,402,054 | 8/1983 | Osborne | 364/554 |
| 4,411,595 | 10/1983 | Pisano | 416/1 |

OTHER PUBLICATIONS

International Search Report dated 18th Dec. 1987 from the European Patent Office.
ISA Transactions, vol. 16, No. 2, 1977, J. F. Donoghue: "Review of control design approaches for transport delay process", pp. 27–34.
Regelungstechnik, vol. 24, No. 7, Jul. 1976, J. Ackermann: "Einfuhrung in die Theorie der Beobachter", pp. 217–252.

Primary Examiner—Donald P. Walsh
Attorney, Agent, or Firm—D. C. Abeles

[57] ABSTRACT

Disclosed are methods and apparatus for the control of dynamic systems, more particularly complex dynamic systems and especially those systems exhibiting minimum phase behavior. The method utilizes observer theory to estimate the state variables of the system. Based in part upon the estimated values of the state variables, a pseudo or compensated output for the system is generated. This compensated output represents the steady state asymptote of the actual system output without the unstable or transient system responses. The actual outputs are then controlled by controlling the compensated output.

According to another embodiment, a bounded output may also be generated from the state variable estimates. This bounded output represents the minimum and/or maximum excursion that the actual output takes in its approach to the steady state value represented by the compensated output. This bounded output is then used to control the system so as to prevent the actual output from crossing any predetermined system limits.

9 Claims, 4 Drawing Sheets

METHODS AND APPARATUS FOR DYNAMIC SYSTEMS CONTROL

BACKGROUND OF THE INVENTION

The present invention relates to methods and apparatus for the control of dynamic systems. More particularly, the present invention relates to methods and apparatus for controlling dynamic systems exhibiting non-minimum phase behavior.

There has recently been much interest in the development of methods and techniques for controlling complex dynamic systems. Dynamic systems having non-minimum phase behavior are examples of one type of such complex systems. Non-minimum phase behavior is a term used in the art to describe certain types of frequency domain transfer functions relating system inputs to system outputs. Such non-minimum phase behavior is typical of distributed parameter systems. Transportation lag or pure time delay between an input signal and its corresponding output is another form of non-minimum phase behavior. Non-minimum phase behavior is also exhibited by systems in which an input produces an initial negative response in the system output, with a subsequent change of sign and approach of the output to its positive asymptote. An example of one type of this non-minimum phase behavior is often called "shrink-swell" behavior by operators of such systems. Such shrink-swell behavior is usually associated with systems whose transfer functions contain right half plane zeros.

The control of water level in the secondary loop of a nuclear steam supply system is difficult because the system behaves with non-minimum phase dynamics. Changes in reactor power, steam flow, feedwater temperature and feedwater flow all affect the measured level in the steam generator. The level controller in such a system maintains the level in the steam drum on target and within limits by changing feedwater flow to compensate for the changes in level produced by other factors. In systems exhibiting non-minimum phase behavior, the system cannot be easily controlled by simple feedback of the error level. For example, if the feedwater controller in a nuclear steam supply system responds only to existing level error, the system can become unstable. Because of the long lag times in such systems, controller responses which are made only after a disturbance in level has occurred are not likely to produce an effect on level in time to avoid crossing a limit. The classical approach to this problem is to speed up controller response by adding derivative action to the controller. Frequently, however, such an approach can result in unstable control for systems having non-minimum phase dynamics. More particularly, in a "shrink and swell" system the control action that ultimately brings the system back into balance is the same action which initially exacerbates the problem. As a result, derivative action will generally result in unstable control.

For systems having complex dynamics, controller performance can be dramatically improved by providing information that helps the controller anticipate output behavior. In many such systems, however, prediction of the system behavior is difficult because access to the critical state variables of the system is not generally available. For example, in nuclear power plant steam supply systems, accurate measures of steam flow and feed water flow are not generally available at low power rates. As a result, the controller generally has no direct way of knowing whether steam flow and feedwater flow are in balance and how much of a change in feedwater flow is required to bring them into balance. Reliance is placed almost exclusively on level trend to infer this information. Because of the long lags and shrink and swell effects previously discussed, there is significant delay before information about the feed flow/steam flow balance is manifested in level behavior.

Several control methods have heretofore used such predictive information to mprove controller performance. One method for developing such information, sometimes referred to as "quickened display", combines current parameter error with velocity and even acceleration information in a single display element. See for example "Man-Machine Systems:Information, Control, and Decision Models of Human Performance", MIT Press, 1974, by Thomas B. Sheridan and William R. Ferrell, at pages 268-270. Because the velocity is combined with the current value of the parameter, the quickened display indicates where the controlled parameter is likely to be if no control action is taken. It should be noted, however, that these predictions are based upon recent past performance of the system and not the intrinsic dynamics of the system.

Other control methods, known as simulation based control, use predictive information to explicitly project the future value or trajectory of the controlled parameter. See for example Man-Machine Systems, supra, at 271-273. In this method, a computer simulation of the system is run faster than real time to generate a projection of parametric behavior. This type of prediction is subject to increasing error as the projection moves further from the current data. Simulation based control such as this is also subject to error based on discrepancies between the dynamic model of the system and the actual plant dynamics. The use of such control methods is severely limited because of these two types of errors and because of the expense and technical limitations of running sufficiently valid models faster than real time. Even if these disadvantages were to be overcome, methods such as this would be unsatisfactory for systems with rate integration dynamics or unstable right half plane poles since the errors in such systems increase without bounds when prediction is based upon such methods.

The use of fast time model based information to aid in the control of steam generator level in a nuclear power plant has been suggested by Venhuizen, J. R. and Griffith, J. M. in their article entitled "Predictor Display Concepts for Use in Nuclear Power Plant Control", National Technical Information Service, 1983. It is suggested that a predictor could be developed through Kalman filter techniques for estimating the state of a linear system. Even with accurate state information via a Kalman filter, fast time simulation techniques produce unacceptable error behavior for systems with rate integration or unstable dynamics. Moreover, the fast time simulation approach does nothing to alleviate the difficulty of controlling non-minimum phase systems.

SUMMARY OF THE INVENTION

It is accordingly an object of the present invention to provide methods for effectively controlling complex dynamic systems.

It is a further object of the present invention to provide methods for controlling systems having rate integration or unstable dynamics.

It is a still further objection of the present invention to alleviate the difficulty associated with controlling non-minimum phase systems.

According to one embodiment of the present invention, a method for controlling dynamic systems having non-minimum phase dynamics is provided. Included in this method is the step of measuring the inputs and outputs to the system, one of said inputs being a load variable and another of said inputs being a manipulated variable. A further step comprises generating signals representative of said inputs and outputs. This method also provides the step of estimating the state variables of the system by passing the input and output signals through an observer block. A compensated output parameter containing information about the future state of said system is then generated. This compensated output parameter is functionally related to the state variables, said functional relationship being determined by the establishment of an identity of the following form:

$$H_c(s) = \sum_{i=1}^{n} c_i \cdot G_i(s)$$

where $H_c(s)$ is a compensated transfer function comprising a subset of the normal modes of behavior included in the overall transfer function relating the transforms of said inputs to the transforms of said outputs, said subset including at least the integration modes and unstable modes of said overall transfer function, where $G_i(s)$ is the observer based transfer function relating the transform of said manipulated variable to the transform of said state variable, and where $c_i$ are the unique set of constants which satisfy said identity. The unique set of $c_i$ which are thus determined are then included as multipliers on the corresponding state variables in the functional relationship between said compensated output and said state variables. Having thus generated a compensated plant output according to the present invention, the output of the dynamic system is then controlled by controlling the compensated output.

According to another embodiment of the present invention, a method for controlling a dynamic system of the type having at least one output and at least two inputs is provided. This method includes the step of estimating the state variables of the system based upon said inputs and outputs. The method then further requires generating a compensated output from said state variables, said compensated output being dynamically related to said inputs such that no integration modes and no unstable modes exist for said dynamic relation, whereby said compensated output is a steady state asymptote of said output. Having thus generated the compensated output according to the methods of the present invention, the output of said dynamic system is controlled by controlling the compensated output.

According to another embodiment of the present invention, an apparatus for aiding in the control of dynamic systems of the type having inputs and outputs is provided. The apparatus includes means for generating signals representative of the inputs and outputs and means coupled to said generating means for estimating the state variables of said system based upon said inputs and outputs. An important feature of the present invention resides in the provision of means for generating a compensated output from said estimated state variables, said compensated output being dynamically related to said inputs such that no integration modes and no unstable modes exist for said dynamic relation, whereby said compensated output is the steady state asymtote of said output.

DETAILED DESCRIPTION

Figure 1:
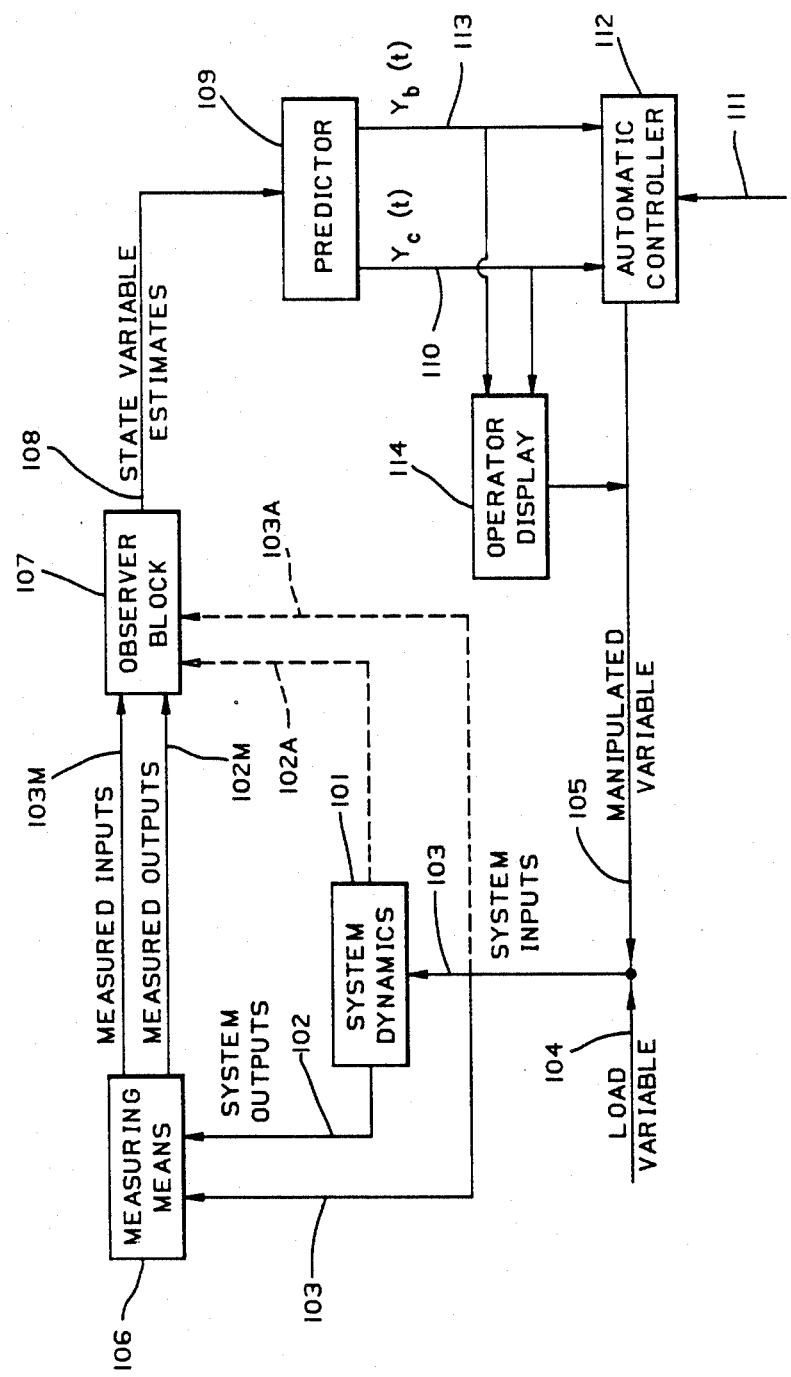
FIG. 1 is a schematic representation of a control system according to the present invention.

The present invention relates to an apparatus for the control of dynamic systems. The methods and apparatus of the present invention are generally applicable to all systems. For example, it may be applied to process plants, process simulators, or electronic systems.

Dynamical systems can be generally represented by a set of differential equations of the form $$\frac{d x(t)}{dt} = A x(t) + B v(t) \quad (1)$$

where x(t) is an n-vector function of time completely specifying the condition of the plant, A is an n by n state transition matrix, v(t) is an m-vector input function of time and B is an n by n distribution matrix. Results which are produced by the system are generally known as outputs of the system. These outputs generally fall into two classifications, measurable outputs and unmeasurable outputs. Measurable outputs generally include the physical manifestations of the system, such as flow rate or signal voltage, while the non-measurable outputs generally include noise produced by the system. The measurable outputs of the system are generally related to the state variables of the systems according to the following equation $$y(t) = Cx(t) \quad (2)$$

where y(t) is an r-vector function of time representative of the measurable outputs of the system and C is an r by n output matrix. Dynamic systems are generally controlled by manipulation of one or more of the components which make up the inputs v(t) of the system in order to control at least one of the components which make up the outputs y(t) of the system.

The operation of observer blocks and the observer theory upon which they are based are well known in the art and will not be discussed in the present specification in detail. For a detailed discussion of observer theory see "Optimum Systems Control", 2nd Prentic Hall (1977), by Andrew P. Sage and Chelsea C. White III, which is incorporated herein by reference. According to the methods of the present invention, an observer block is used to act on the vector time functions v(t) and y(t) to reconstruct an estimate, $\hat{x}(t)$, of the plant states x(t). In order to aid in the understanding of the present invention, a brief outline of observer theory is provided.

The observer is a dynamical system governed by the differential equation, $$\frac{dz(t)}{dt} = F z(t) + L y(t) + T B v(t) \quad (3)$$

where $z(t)$ is an s-vector function of time, $F$ is an s by s state transition matrix, $L$ is an s by r distribution matrix, and $T$ is an r by n matrix which satisfies the following matrix equation:

$$TA - FT = LC \quad (4)$$

with $$r + s = n \quad (5)$$

Selection of $L$ and $F$ which define the observer are treated in modern control theory literature on observer design and therefore are not examined in detail in the present specification. Standard procedures also exist for the solution of Equation 4 when $F$ is in Jordan canonical form. According to observer theory, the following equation holds:

$$\hat{x}(t) + R y(t) + S z(t) = x(t) + e_x(t) \quad (6)$$

where $R$ is an n by r matrix taken from the first r columns of the n by n matrix $M$, where $$M = \begin{bmatrix} C \\ T \end{bmatrix}^{-1} = [R\ S] \quad (7)$$

and where $S$ is an n by s matrix taken from the last s columns of $M$. The error term behaves as $$e_x(t) = S \cdot e^{Ft} \cdot z_E(o) \quad (8)$$

where $e^{Ft}$ is the matrix exponential function and $$z_E(0) = z(0) - T x(0) \quad (9)$$

is the initial error in the observer states. Since $F$ is always chosen to have left-half plan eigenvalues, $e_x(t)$ approaches zero as the system runs in time. Equations 3 through 9 are well known in the literature and thus the design of an observer to obtain the estimated states $\hat{x}(t)$ is well known.

Referring now to FIG. 1, a description of a control system according to the methods and apparatus of the present invention will now be described. It is known that every system, whether it be process, electrical, or otherwise, is governed over time according to the internal dynamics of the system. In the illustration shown in FIG. 1, these dynamics are represented schematically by block 101. The system inputs 103 act through the system dynamics to effect changes in the system outputs 102. The exact quality and quantity of these changes for any given change in system inputs is determined by the system dynamics 101. It will be appreciated by those skilled in the art that systems having complex dynamics will always have at least one output and will generally have at least two inputs. Included in the system inputs for most complex dynamic systems are at least one load variable 104 and at least one manipulated variable 105. The load variable will generally be independent of the particular control system under investigation. The manipulated variable 105 is controlled by the control system in order to affect the system output 102 in a predetermined fashion. In many systems, such as some electrical systems for example, the system inputs and system outputs are feed directly to the observer block of the present invention as shown at 102A and 103A. In other systems, such as chemical process systems and nuclear steam supply systems, system inputs and system outputs are coupled to measuring means represented schematically by block 106. The measuring means then generate signals 102M and 103M representative of the measured values for the system inputs and system outputs respectively. The observer block 107 receives the system inputs and outputs or the signals representative thereof. Based upon these inputs and outputs, the observer block 107 then generates estimates, $\hat{x}(t)$, of the state variables of the system. It should be noted that as long as the measured inputs 103M and the measured outputs 102M closely approximate the actual inputs 102A and the actual outputs 103A, the state variable estimates 108 generated by observer block 107 will be very close approximations of the state variables of the system.

The state variables thus estimated are sent to the predictor block 109. The predictor block 109 uses a linear combination of the state variable estimates to generate a compensated output $y_c(t)$, labelled as 110 in FIG. 1. An important feature of the present invention resides in the properties of the compensated output. More particularly, the transfer function between the manipulated variable 105 and the compensated output 110 has no right half plane zeroes. As the term is used herein, a right half plane zero is a root of the numerator of a transfer function, wherein the root is located to the right of the imaginary axis in the complex plane. According to a preferred embodiment of the present invention, this transfer function also does not have any time delay. The compensated output $y_c(t)$ is thus generated according to the methods of the present invention such that it represents the steady state asymptote of the system output 102.

The dynamic relationship between the system inputs and the system outputs can generally be described according to the following equation $$Y(s) = H_u(s) \cdot U(s) \pm H_w(s) \cdot W(s) \quad (10)$$

where $Y(s)$ is the Laplace transform of the system output, $U(s)$ is the Laplace transform of the manipulated variable, and $W(s)$ is the Laplace transform of the load variable. $H_u(s)$ and $H_w(s)$ are the transfer functions relating their respective inputs to the outputs. The transfer function for the manipulated variable can generally be written according to the following partial fraction expansion, $$H_u(s) = \sum_{i=1}^{m_T} \left( \sum_{j=i}^{m_i} \frac{a_{ij}}{(s - \lambda_i)^j} \right) \quad (11)$$

where $m_i$ is the multiplicity of roots $i$ and $m_T$ is such that if the system order is n then $$n = \sum_{i=1}^{m_T} m_i \quad (12)$$

A compensated transfer function according to the present invention may then be defined by first defining a subset $S_1$ of the natural modes of the manipulated variable transfer function $H_u(s)$. As the term is used herein, a mode is a pole or root of the transfer function. As the term is used herein, a pole or root of a transfer function is a root of the denominator of the transfer function. More particularly, a pole or root is a value of s of the transfer function for which the value of the transfer function approaches infinity. An integration mode is a pole or root having a value of s equal to zero. Included in the subset $S_1$ are those poles or roots of $H_u(s)$ for which: (1) the real part of $\lambda_i$ is greater than or equal to zero; or (2) $\lambda_i$ represents a dominant mode of $H_u(s)$ near no zeroes of $H_u(s)$. The first condition assures that all unstable modes and integration modes of the manipulated variable transfer function are controlled while the second condition permits modification of the behavior of any dominant stable modes. While the subset $S_1$ should contain at least those modes described above, other modes of the manipulated variable transfer function can be included in the compensated transfer function.

With the subset $S_1$ thus defined, several techniques are available for defining the compensated transfer function according to the present invention. For the purposes of illustration, such techniques will be discussed below.

The compensated transfer function, $H_c(s)$, of the present invention may be defined according to an equation having the following form $$H(s) = K_1 \pi_{\lambda_i \epsilon S_1} \left( \frac{1}{(s - \lambda_i)^{m_i}} \right) \tag{13}$$

with the constant $k_1$ chosen such that $$\lim_{s \to 0} \left( \frac{H_c(s)}{H_u(s)} \right) = 1 \tag{14}$$

Equation 13 ensures that $H_c(s)$ has no right half plane zeros and includes all modes that need to be stabilized or speeded up in their responses. Equation 14 ensures that $H_c(s)$ has the proper asymptotic behavior near $S=0$. Another method for defining $H_c(s)$ is to utilize the following equation $$H_c(s) = \sum_{\lambda_i \epsilon S_1} \left( \sum_{j=1}^{m_i} \frac{a_{ij}}{(s - \lambda_i)^{m_j}} \right) \tag{15}$$

With the compensated transfer function in the form of equation 15 it is necessary to ensure that $H_c(s)$ has no right half plane zeros. If this is found to be true, then this definition of $H_c(s)$ is appropriate for the present invention.

It will be appreciated that other methods for generating compensated transfer functions are available. For example, the right hand side of equation 13 may, in general, may be multiplied by a polynominal having only left half plane zeros. This multiplication will result in a compensated transfer function having the properties described above.

Since the observer block gives an estimate of all the state variables of the system, a linear combination of the state variable estimates $\hat{x}_i(t)$ can be related to the transform of the manipulated variable U(s) according to the following equation $$\hat{X}_i(s) = G_i(s) \cdot U(s) \tag{16}$$

where $\hat{X}_i(s)$ is a transform of the state variable estimate, and $G_i(s)$ is the transfer function relating U(s) to $\hat{X}_i(s)$. An important feature of the present invention resides in establishing an identity between the compensated transfer function $H_c(s)$ and the observer based transfer function $G_i(s)$. More particularly, the applicant has found that the following identity can be established $$H_c(s) = \sum_{i=1}^{n} c_i \cdot G_i(s) \tag{17}$$

where $c_i$ are those uniquely determined constants which satisfy the above identity. Techniques such as advanced linear algebraical manipulation are available for determining the set of $c_i$ which satisfy the identity of equation 17. With the uniquely determined set of constants $c_i$ thus established, the compensated system output is determined according to the following equation $$y_c(t) = \sum_{i=1}^{n} c_i \cdot \hat{x}_i(t) + k_2 \cdot w(t) \tag{18}$$

where $c_i$ are determined by the identity disclosed in equation 17, the estimated plant states are determined by the observer block 107 and $K_2$ is chosen so as to ensure that the compensated output has the same value as the actual output when the system is at steady state.

In systems having time delays represented by $e^{-sT}$ for the transfer function of the manipulated variable $H_u(s)$, the time delays can be approximated by a rational transfer function expansion that accurately represents $e^{-sT}$ up to an appropriately chosen cutoff frequency. These techniques are known in the art and are not described in detail in the present specification. By using such methods to approximate the time delay, the previously described methods for generating the compensated output can be applied to systems having time delay.

By eliminating both time delay and right half plane zero behavior from the compensated output, the present invention provides a compensated output variable $y_c(t)$ which is very simple to control. Moreover, the control of $y_c(t)$ to a steady state value brings the actual system output to the same steady state value. According to one embodiment of the present invention, the system outputs 102 are controlled by controlling the compensated output 110. More particularly, referring again to FIG. 1, the value of $y_c(t)$ is compared in automatic controller 112 to a set point 111. Based upon the difference or error between set point 111 and compensated output 110, the controller 112 will make adjustments to the manipulated value 105 so as to minimize error between the compensated output and the set point. Since the system output 102 will asymptotically approach the compensated 110 under steady state conditions, control of the compensated output 110 provides for effective and stable control of the system outputs 102 even when the system dynamics 101 contain right half planes zeros or time delay.

Another important feature of the predictor block 109 of the present invention is the inclusion therein of means for predicting the bounded outputs $Y_b(t)$, labelled as 113 in FIG. 1. Thus, predictor 109 provides an accurate estimate of the maximum or minimum excursion of the system outputs 102 for fixed values of the load variable and the manipulated variable. Even though the compensated output defined according to the techniques described above has no right half plane zeroes, the system output always retains any right half plane zero behavior regardless of how one chooses to manipulate the variable 105. Thus, it is desirable to prevent the system from crossing limits that the system output 102 may otherwise reach in its trajectory to the steady state as predicted by the compensated output 110. The bounded output $Y_b(t)$ represents that maximum and/or minimum excursions of the system outputs 102 for a constant load variable and either constant manipulated variable or a constant linear feedback law governing the manipulated variable.

The method of predicting the bounded output includes solving the following equation for all values of t in the future $$\frac{dy(t)}{dt} = 0 \tag{19}$$

The solution to the above equation is then used to find the extrema of the trajectory for the plant outputs. The steady state solution of equation 1, subject to $v(t)=v_0$, is $$x(t) = e^{At}x(0) + A^{-1}[e^{At} - I]Bv_0 \tag{20}$$

where I is the n by n identity matrix and x(0) is the state at t=0. The expression $A^{-1}[e^{At}-I]$ can be expanded in terms of normal modes. Hence, one finds such that $$\frac{dy(t)}{dt} = C\frac{dx(t)}{dt} = C A X(t) + C B v_o = 0 \tag{21}$$

The values of t thus derived are used to compute the extrema of the system outputs.

If the manipulated variable is implemented by linear control law such that $u(t) \leq -k(x(t)-x_o)$ where k feedback matrix and $x_o$ is the steady state solution corresponding to $u=w=w_o$, the bounded output can be solved by modifying the A matrix of equation 20 as follows $$A' = A = kb_u \tag{22}$$

where $b_u$ is the column of B multiplying u(t) in equation 1. This value of A' can then be used in equations 20 and 21 to compute the extrema. Thus, the extrema can be predicted according to the present invention under constant control for the unit operator or under linear feedback for the automatic controller.

According to another embodiment of the present invention, the compensated output 110 and bounded output 113 may be made available to the human operator by means of the operator display 114 in order to improve the performance of either an automatic controller or a human operator. In the case of a human operator, his/her performance can be improved in a number of ways. For example, the compensated output and bounded output can be displayed along with other selected inputs and outputs during actual system operation. In other applications, this same information can be used as training devices to provide an operator with concrete experience with the non-intuitive dynamics of non-minimum phase systems. Effective prediction and control is based, in part, on the controller having a good internal model of the dynamics of the process under control. A human controller develops his/her internal model and predictive capability through experience with the control task. The present invention can provide the human operator with improved visualization of the system or process dynamics and can increase the effectiveness of training time on the control task. In either case, it is preferred that the information generated according to the present invention be presented graphically to the operator or trainee during control of the actual or simulated system. There are several ways to deploy the predictive information generated according to the methods of the present invention. For example, a trend plot of the compensated output can be presented parallel with or along side a trend plot of the actual plant output for the particular system in question. This allows visual comparison of the two curves and enables the human controller to distinguish steady state changes from transient effects on system output. That is, for example, the human controller will be able to visualize the shrink/swell effects described above and will be able to distinguish them from non transient behavior of the system. Due to the properties of the compensated output described above, the actual system outputs will approach the compensated outputs as the transient effect of the system dynamics die away with time. More particularly, since at any point in time the compensated output represents the ultimate steady state value of the system outputs, the difference between the compensated output 110 and the actual system output 102 at any moment in time provides information about the future behavior of the system output.

According to another preferred embodiment of the present invention the bounded output 113 may be displayed to the human operator as an aid in control of the system in question. That is, the methods of the present invention allow either the human operator or the automatic controller to receive information on the minimum/maximum excursion that will result in the actual system outputs 102 due to a current change in a system input 103. Thus an operator can see at a glance the maximum or minimum excursion that will occur in the system outputs 102 as its completes its trajectory to the steady state value predicted by the compensated output 110. If the value of the bound output indicates this excursion will exceed some predefined limits in the system output, the human operator can take corrective action and instaneously see the results that this action will have on both the bounded output and compensated output. For example, if the bounded output is near a limit value for the system, the controller, whether it be automatic or human, can adjust the rate of change of the system output 103 to bring it on target more slowly.

It will be appreciated by those skilled in the art that other techniques are available for the use and display of the compensated output and bounded output generated by the present invention. For example, the bounded output could be deployed as a dynamic limit on the rate of change in the manipulated variable 105. This limit could be calculated on the difference between the compensated output and the system output relative to the target value and on the differences between the minimum/maximum value and a low/high limit values.

According a preferred embodiment of the present invention, observor block 107 and predictor 109 are electronic circuit means which perform functions described above. In another preferred embodiment, said circuit means comprises a microprocessor having computational and memory capacity. The observor block 107 and the predictor 109 are appropriately coupled such that the state variable estimates generated by the observor block are received by the predictor. In a preferred embodiment of the present invention, operator display 114 comprises a cathode ray tube display and software associated therewith for graphically illustrating the actual system inputs 103, the actual system outputs 102, the compensated output 110, and the bounded output 113. In other embodiments, it may be desirable to provide said cathode ray tube display with multicolored display means. Automatic controller 110 can be any automatic controller capable of accepting and acting upon inputs 111, 110 and 113.

For the purposes of illustration and not by way of limitation, a relatively simple example of the use of the present invention in a nuclear reactor steam system is presented below.

Figure 2:
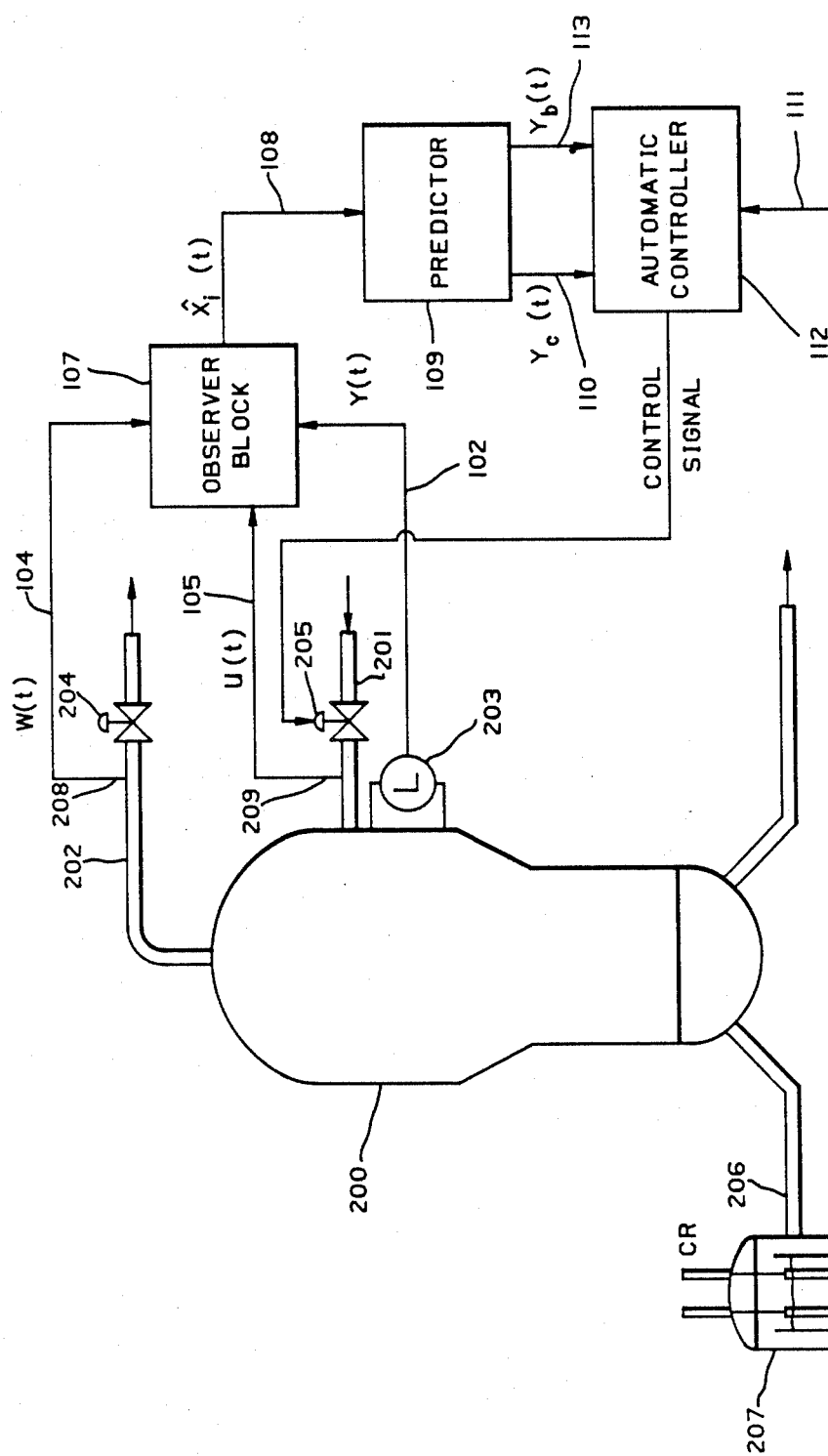
FIG. 2 is a schematic representation of a control system according to the present invention operating on a nuclear steam supply system.

Referring now to FIG. 2, a schematic view of the nuclear reactor steam supply system coupled to one embodiment of the present invention is disclosed. The steam generator vessel 200 is supplied with feedwater through inlet manifold 201. The steam thus generated exits through steam manifold 202. A level control element 203 provides an indication of the feedwater level in the steam generator 200. The rate of steam flow from manifold 202 is determined by the position of valve 204 while the rate of feedwater flow into the generator 200 is determined by the position of valve 205. The heat input to the steam generator 200 is determined by the flow and temperature of process water passing through a manifold 206, which is in turn determined by the energy released by the nuclear reactor 207. Measuring elements 208 and 209 measure the pertinent properties of the feedwater and steam flow respectively. More particularly, measuring element 208 determines the rate of the steam flowing through manifold 202 while element 209 measure the rate of the feedwater entering generator 200. In the context of the present example, steam generator 200 represents the system dynamics, the level of the feedwater indicated by level indicator 203 is the output of the system, and the feedwater flow and the steam flow represent inputs to the system. More particularly, in the control scheme revealed in FIG. 2, feedwater flow comprises the manipulated variable while the steam flow comprises the load variable. Thus, the feedwater level, the feedwater flow, and the steam flow are sent to the observer block 107 and are represented by the symbols y(t), u(t) and w(t) respectively. The observer block 107 acts upon these system inputs and the system output and generates an estimate of the state variable $\hat{x}_i(t)$.

Figure 3:
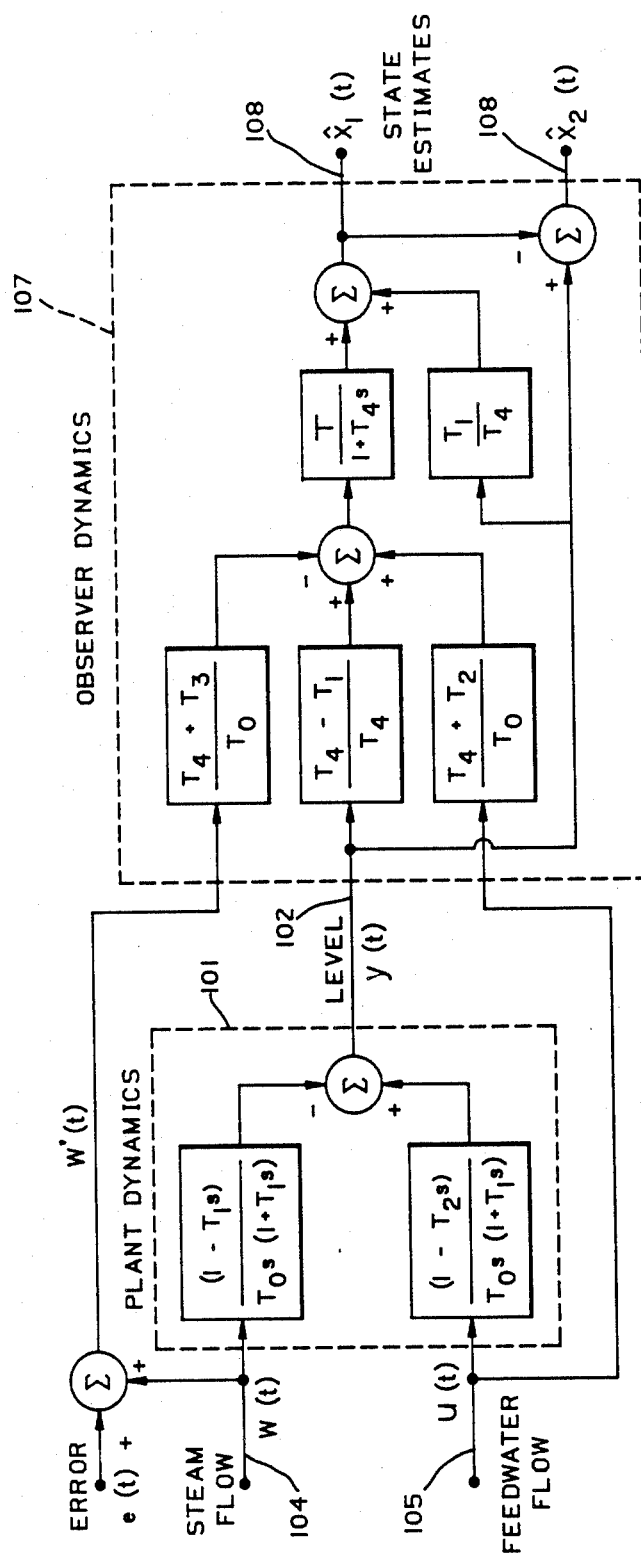
FIG. 3 is a block diagram of a portion of a control system shown in FIG. 2.

In order to more clearly understand the system shown schematically in FIG. 2, a more detailed block diagram of the system dynamics of steam generator 200 and the dynamics of the observer block 107 to which it is coupled is shown in FIG. 3. In this simple system, the plant dynamics 101 are represented by the following nonminimum phase transfer functions $$H_u(s) = \frac{(1 - T_2 s)}{T_0 s(1 + T_1 s)} \quad (23)$$

and $$H_w(s) = \frac{(1 - T_3 s)}{T_0 s(1 + T_1 s)} \quad (24)$$

where $H_u(s)$ is the transfer function for the feedwater flow, H(s) is the transfer function for the steam flow, and $T_0$ and $T_3$ are contants particular to the system. These transfer functions have normal roots at s=0 and $s = -1/T_1$. The right half plane zero at $s = 1/T_2$ makes this system difficult to control from feedwater flow u(t). If should be noted that the feedwater flow u(t) is shown as passing into both the system dynamics and the observer dynamics without first passing through a measuring means. In a system of the type discussed in this example, this is a very close approximation of actual conditions since feedwater flow is generally very acurately known. On the other hand, FIG. 3 indicates that the steam flow, while feeding directly into the plant dynamics, is joined with an error term e(t) which represents the error introduced into the measured steam flow by measuring means 208. The system dynamics 101 operate on the system inputs, i.e., steam flow and feedwater flow, to produce the system output, i.e., feedwater level Y(t). These inputs and the output are then transferred to the observer block 107, the dynamics of which are shown in FIG. 3. The observer has a single root $s = -1/T_4$. Based upon the Laplace transforms of equations 3 and 6 described above and an observer driven by a plant having the dynamics shown in FIG. 3, the observer dynamics indicated in FIG. 3 are derived. The observer is specified by the four constant coefficients shown in FIG. 3. The observer operates on the plant inputs and output and generates an estimate of the state variables. The two estimates of the state variables in normal form are shown as $\hat{x}_1(t)$ and $\hat{x}_2(t)$.

Of the system dynamics shown in FIG. 3, the compensated transfer function shown below results from either of the methods described above:

$$H_c(s) = \frac{1}{T_0 s} \quad (25)$$

This form of $H_c(s)$ results since the transfer functions for the inputs have no unstable poles and have only a single integration pole at s=0. For the purposes of convenience and illustration, but not by way of limitation, it is desirable to assume that $u(t) = w(t) = w_0$, where $w_0$ is an equilibrium point for some range of w(t) and thus, $H_w(s)$ and $H_u(s)$ will have different residues only for the stable modes of the transfer functions. Based upon this assumption, $K_2$ can be determined as follows so as to ensure that the steady state value of actual feedwater level is ultimately identical to the compensated feedwater level value.

$$k_2 = \lim_{s \to 0} [H_u(s) - H_w(s)] = \frac{T_3 - T_2}{T_0} \quad (26)$$

Satisfying the identity of equation 18, the compensated level is thus generated as follows $$y_c(t) = \hat{x}_o(t) + \left[\frac{T_3 - T_2}{T_0}\right] w(t) \quad (27)$$

The generation of the bounded output $y_o(t)$ is as follows.

$$y(t + \Delta t) = \hat{x}_o(t + \Delta t) + \hat{x}_1(t + \Delta t) \quad (28)$$

where $$\hat{x}_1(t + \Delta t) = \hat{x}_1(t) + \Delta t \cdot v \quad (29)$$

and $$\hat{x}_2(t + \Delta t) = \hat{x}_2(t)e^{-\Delta t/T_1} + (1 - e^{-\Delta t/T_1})^1 z \quad (30)$$

where $$v = (u - w)/T_o \quad (31)$$

and $$z = [(T_1 + T_3)w - (T_1 + T_3)u]/T_o \quad (32)$$

Thus with an explicit solution for $y(t+\Delta t)$ one can easily differentiate equation 28 to find $\Delta t$ for which $$0 = \dot{y}(t + \Delta t) = v + e^{-\Delta t/T_1}(s - \hat{x}_2(t))/T_1 \quad (33)$$

Solving for the exponential term one gets $$e^{\Delta t/T_1} = \frac{\hat{x}_2(t) - z}{v \cdot T_1} \quad (34)$$

as the condition for the time at which an extrema occurs. For this plant, four possibilities exist 1. $u=w$ so that $v=0$ and equation 34 has no solution. In this case $$y_b(t) = y_c(t) \quad (35a)$$

2. The term on the right is negative and again equation 34 has no solution. This is the case where the derivative of $y(t)$ does not change sign. Again $$y_b(t) = y_c(t) \quad (35b)$$

3. A solution exists to equation 34 but $\Delta t$ is negative. In this case the present time is past the point at which the trajectory of $y(t+\Delta t)$ goes through an extrema. Again $$y_b(t) = y_c(t) \quad (35c)$$

4. A solution exists to equation 34 and $\Delta t$ is nonnegative. In this case one substitutes this value of $\Delta t$ in equations 29 and 30, then evaluates Equation 28 to find $$y_b(t) = \hat{x}_1(t) + v \cdot T_1 \left[1 + \ln\left(\frac{\hat{x}_2(t) - z}{v \cdot T_1}\right)\right] + z \quad (35d)$$

The function $y_b(t)$ is continuously evaluated as a function of the state estimates $\hat{x}_1(t)$, $\hat{x}_2(t)$, the steam flow $w(t)$ and the feedwater flow $u(t)$. If $u(t)$ and $w(t)$ are held constant and equation 35d applies, $y_b(t)$ remains constant as a function of time until the maximum/minimum is reached. After the trajectory $y(t)$ either peaks or bottoms out $y_b(t)$ jumps discontinuously to the value of $y_c(t)$.

Figure 4:
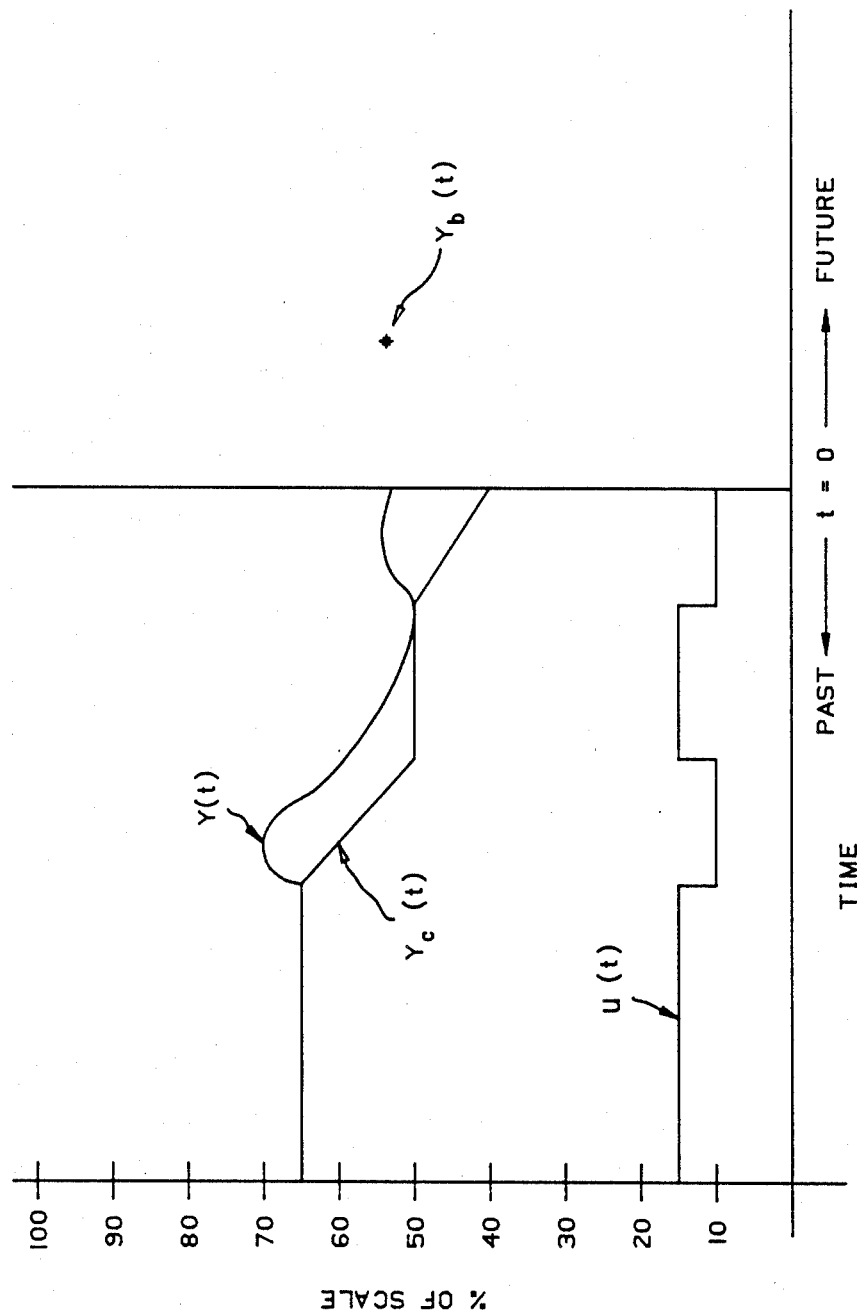
FIG. 4 is a representation of the operator display according to one embodiment of the present invention.

Referring now to FIG. 4, one method of displaying the predictive information generated according to the present invention in order to aid the human operator in the control of a nuclear steam supply system is disclosed. The abscissa of this graph represents time where $t=0$ is the present; points to the left of $t=0$ represent the past; and points to the right of $t=0$ represent the future. The ordinant of this graph, for the purposes of convenience, represents the percent of scale for each of the variables shown in the graph. The system output, in this case feedwater level $y(t)$ is displayed concurrently with the compensated output $y_c(t)$. Changes in the manipulated variable, in this case feedwater flow $u(t)$ are also shown. It should be noted that the graphs in FIG. 4 qualitatively represent the response of the systems dynamics shown in FIG. 2 in the situation in which no control action is implemented. Thus it is seen that the dynamics of the steam supply system are such that a step change reduction in the feedwater flow $u(t)$ results initially in a gradual increase in the actual feedwater level $Y(t)$. It will be appreciated by one skilled in the art that classical or standard control systems will provide the automatic controller 112 with a very low gain in order to prevent substantial improper manipulation of the feedwater flow. This very low gain in turn will result in a control system which achieves target output only after a very long time. In contrast, the control system according to the present invention will manipulate the feedwater flow according to the value represented by the compensated output $y_c(t)$. More particularly, since the compensated output represents the steady state value which will ultimately be reached by the actual output if $u(t)$ is returned to its equilibrium value, the proper control action can be immediately take when such action is based upon the difference between the compensated output and the set point. As a result, the control system of the present invention responds much more quickly and in such a manner so as to avoid the production of unstable responses. According to a preferred embodiment of the present invention, the bounded output $y_b(t)$ is also displayed to the operator as indicated in FIG. 4. This display will allow the operator to determine at a glance the maximum excursion of the actual feedwater level $Y(t)$ for any change in $u(t)$ and compare these maximum and minimum to the allowed limits for the system. More particularly, an operator can set a value for the feedwater flow $u(t)$ and immediately see what the extremes of the trajectory (if any) will be. If the predicted extrema exceed permissible values the operator can readjust the value of feedwater so that the limits on feedwater level are not exceeded while simultaneously minimizing the time required for the actual feedwater level $Y(t)$ to return to its desired setpoint value after an initial disturbance.

It will be appreciated by those skilled in the art the present invention has uses and advantages which provide a substantial improvement over control systems heretofore known. For example, apparatus and methods of the present control system mitigate the inherent difficulty of controlling non-minimum phase systems. That is, substitution of compensated system output having no time delay or right half plane zero behavior for the actual system output results in a system which is simply and stably controlled. Oscillation, over control and unstable control are avoided. Moreover, the present invention is applicable to systems with unstable modes or pure integration modes in their dynamic description. The problem of drift associated with using a model with an integrator to simulate the plant having integration is avoided. In effect, the observer block 107 relies upon the system itself to perform the integration and thus avoids the need for an integration mode in the observer. In addition, the compensated output provides predictive information that has heretofore been unavailable to either human operators or automatic controllers.

Other advantages and uses of the present invention are also possible. For example, parametric studies can be performed on a simulated plant to determine required modelling accuracies. That is, errors may be deliberately introduced to degrade the observer design in order to study the sensitivity of the operator to both the magnitude and sign of the error. In addition, it can be determined whether the estimates of the model parameters may be biased so that the compensated plant output differs from the actual output in a conservative way.

I claim as my invention:

1. A method of controlling water level in nuclear power plant steam supply systems of the type having steam flow and water flow as inputs to the system and water level as an output of the system, said method comprising:
   (a) estimating the state variables of said system by applying observer theory to the inputs and the outputs of said system;
   (b) generating a compensated water level from said estimated state variables, said compensated water level being dynamically related to said steam flow and feed water flow by a compensated transfer function which comprises the integration modes and unstable modes of behavior included in the overall transfer function relating the transforms of said inputs to the transforms of said outputs, said compensated transfer function having no right half plane zeros;
   (c) displaying said compensated water level and said water level; and
   (d) controlling said water level by comparing the compensated water level and the water level.

2. The method of claim 1 wherein said compensated water level is dynamically related to said feed water flow and said steam flow such that no time lag exists for said dynamic relation.

3. The method of claim 1 or 2 wherein said dynamic relation is such that the estimate of said state variables has a constant multiplier $c_i$, said multiplier being the unique set of constants which satisfy the following identity:

$$H_c(s) = \sum_{i=1}^{n} c_i \cdot G_i(s)$$

where $H_c(s)$ is a compensated transfer function comprising at least the integration modes and the unstable modes of the overall transfer function of the system, where $G_i(s)$ is the observer based transfer function relating the transform of said estimated state variables to the transforms of said system inputs, and where n is the order of the system.

4. The method of claim 1 wherein said controlling step includes comparing said compensated water level to a set point.

5. The method of claim 1 wherein said controlling step further comprises the step of adjusting at least said feed water flow or said steam flow based upon said comparison.

6. The method of claim 1 further comprising the step of generating a bounded water level from said estimated state variables, said bounded water level being an estimate of minimum and/or maximum excursion of said water level over time.

7. The method of claim 6 wherein said controlling step includes comparing said bounded water level to predetermined limits for said water level.

8. The method of claim 7 further comprising the step of displaying said bounded water level.

9. The method of claim 7 or 8 wherein said controlling step further includes comparing said bounded water level to said water level.

* * * * *